Sept. 1, 1925.
J. A. CHARTER
1,551,731
FUEL ATOMIZER
Filed Jan. 29, 1923    3 Sheets-Sheet 1
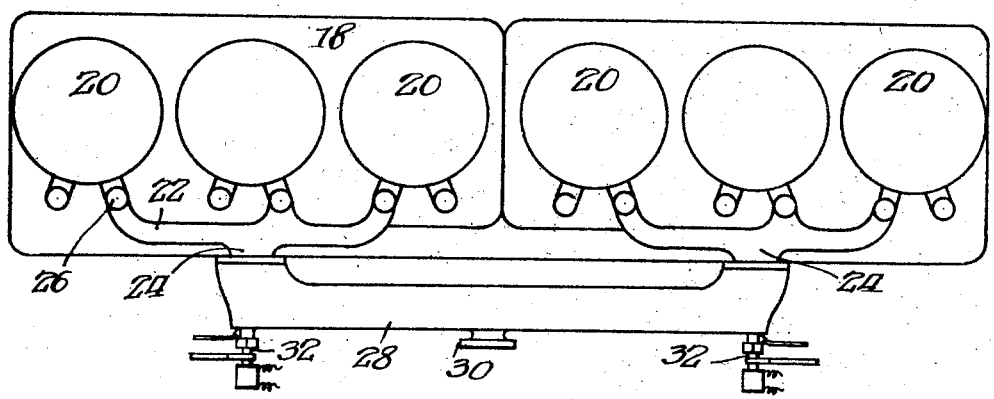
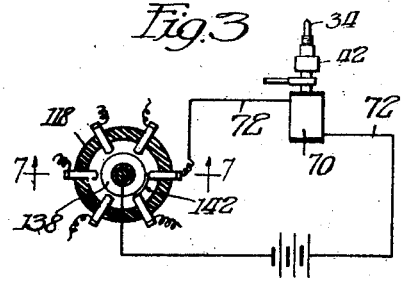
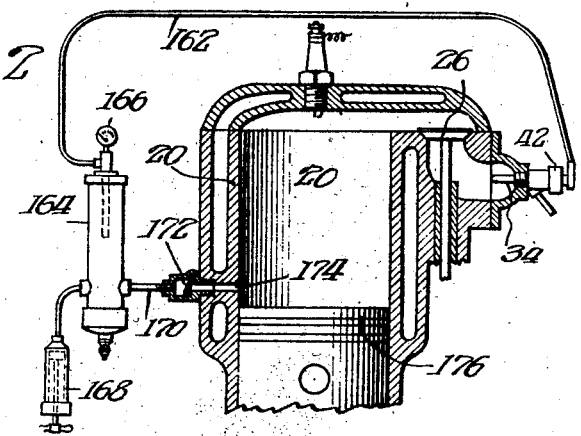
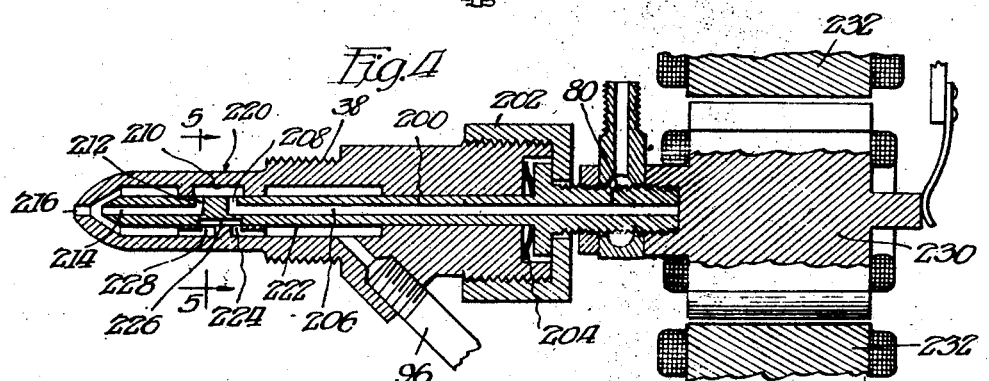
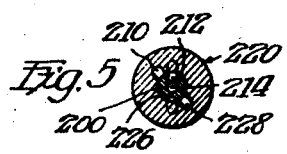
Inventor:
James A. Charter,
By Cheever & Cox
Attys.

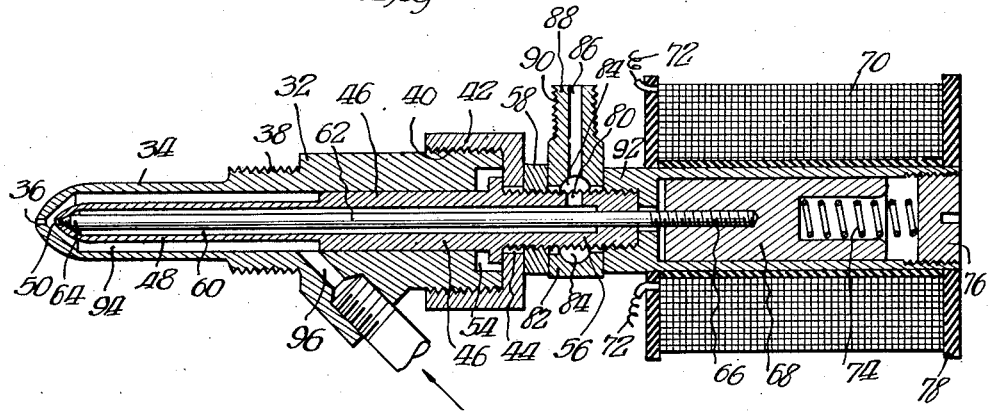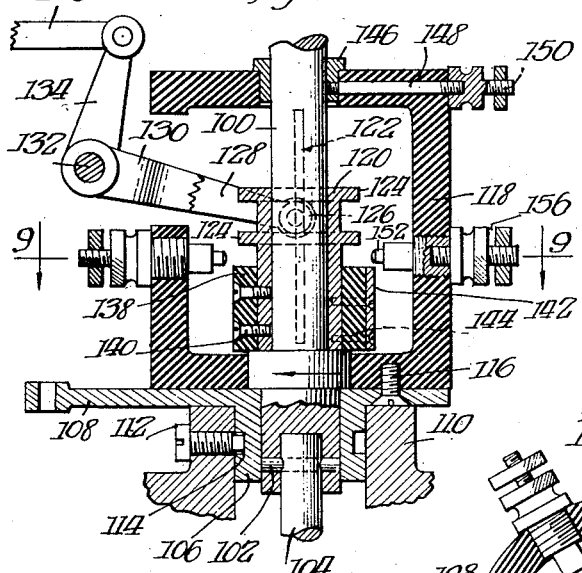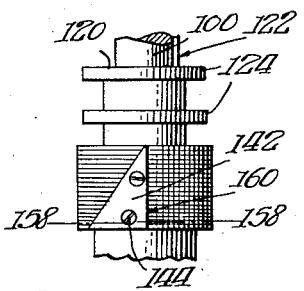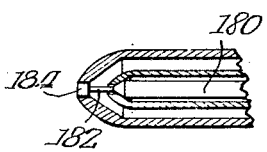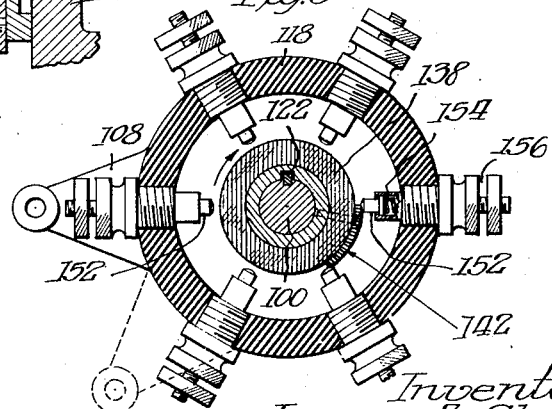

Sept. 1, 1925.
J. A. CHARTER
FUEL ATOMIZER
Filed Jan. 29, 1923
1,551,731
3 Sheets-Sheet 3
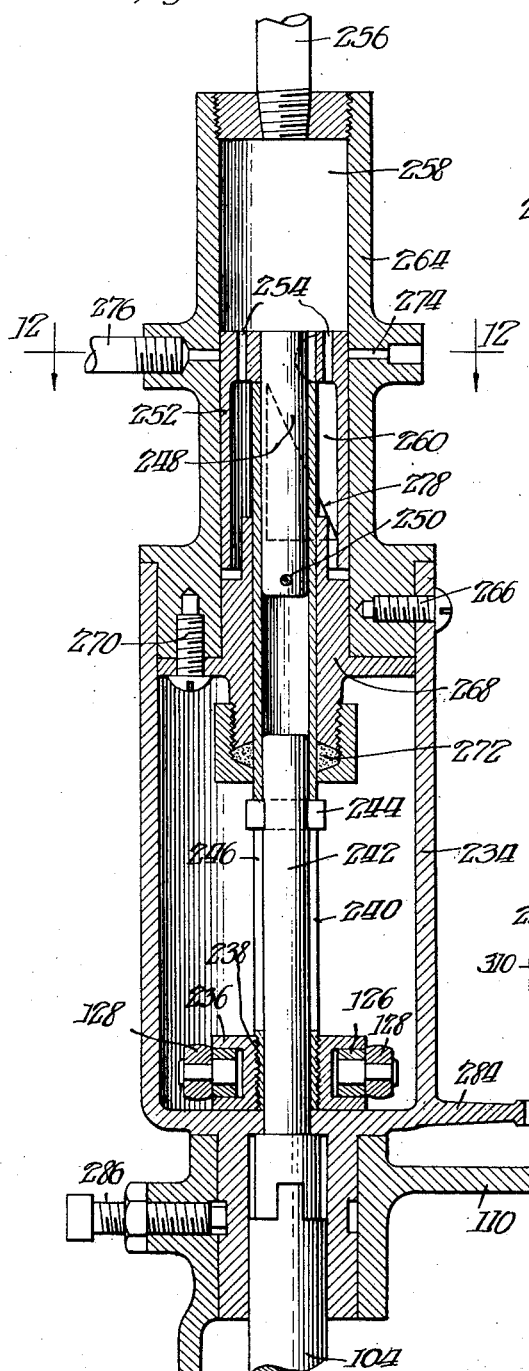
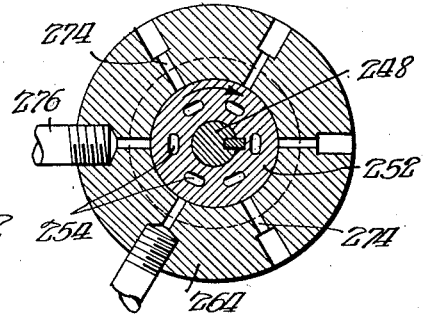
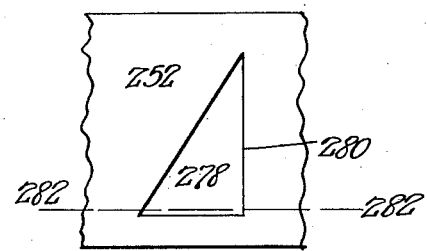
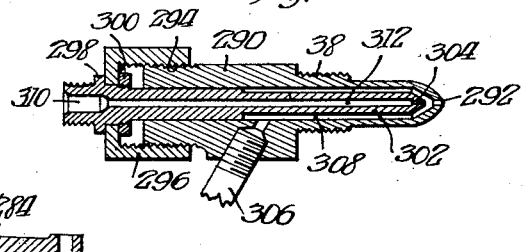
Inventor:
James A. Charter,
By Cheever & Cox
Attys.

Patented Sept. 1, 1925.

1,551,731

UNITED STATES PATENT OFFICE.

JAMES A. CHARTER, OF CHICAGO, ILLINOIS.

FUEL ATOMIZER.

Application filed January 29, 1923. Serial No. 615,687.

*To all whom it may concern:*

Be it known that I, JAMES A. CHARTER, a citizen of the United States, residing at Chicago, in the county of Cook and State of Illinois, have invented a certain new and useful Improvements in Fuel Atomizers, of which the following is a specification.

This invention is a device replacing the present day carbureter on internal combustion engines. Its object is to provide a positive means for carrying the fuel to be consumed in the engine into the engine cylinder without dependence upon the suction of the engine itself. Generically, the invention consists in a mechanism in which a predetermined, measured quantity of liquid fuel is forced into the cylinder at predetermined times in the operation of the engine, the means for so forcing the fuel into the cylinder being an apparatus which utilizes the compressed gases of the engine cylinder, itself, as a motive agent.

More specifically and still quite broadly, the invention is an improvement upon my earlier Patent No. 1,366,445, dated January 25, 1921, in that the compressed motive gases of the cylinder are used to force fuel to the engine cylinder, thereby dispensing with air pumps and other compressed air sources required in using the mechanism of said prior patent.

Still more specifically, the invention consists in mechanism for taking compressed motive gases from an operating engine cylinder, storing said gas until required for fuel injecting purposes and means for then utilizing said stored, compressed gas for injecting the fuel; in a novel, electrical and mechanical device for regulating the quantity of compressed motive material used and the time at which such quantity is delivered to the engine cylinder in the operation of the engine; in the use of supplementary initial starting apparatus to be used when the engine is not running; and also in numerous features and details of construction which will be hereafter more fully set forth in the specification and claims.

In the last mentioned features of invention is a novel construction in which the air nozzle itself acts as a regulator for the fuel nozzle. One advantage of the invention not previously mentioned is that when applied to the standard type of automobile engine of to-day, it renders such engine a constant compression engine:—this with the result that when working on less than a full load, it has high efficiency and increased fuel economy.

Referring to the drawings in which like numerals designate the same parts throughout the several views:

Figure 1 is a diagrammatic plan view of a six cylinder engine showing the intake manifold only, together with the intake valves therefor,—these in combination with the manifold pipe outside the engine and the atomizing device applied thereto—the conventional carbureter normally attached at the center of this pipe being dispensed with.

Figure 2 is an elevation, largely in section, of an engine cylinder, piston and valve mechanism, having the device of this invention in its preferred form applied thereto.

Figure 3 is an electrical circuit diagram for the device used in Figures 1 and 2.

Figure 4 is a sectional detail view of an atomizer mechanism in which rotary valves are employed.

Figure 5 is a sectional detail view on the line 5/5 of Figure 4.

Figure 6 is a sectional detail view, resembling that of Figure 4, of an atomizer in which the air valve is reciprocatable.

Figure 7 is a vertical elevation, largely in section, of an electrical control or distributing head, taken at approximately a central plane, such, for instance, as the one designated 7—7 in Figure 3.

Figure 8 is a side view of a revolving, variable electric switch contact, removed from Figure 7.

Figure 9 is a plan view, taken on line 9—9 of Figure 7.

Figure 10 is a modified nozzle end construction, replacing the device at the left hand end of Figure 6.

Figure 11 is a sectional, detail view of a mechanical revolving valve mechanism capable of replacing the electrical device of Figures 3, 7, 8 and 9.

Figure 12 is a plan view, taken on the line 12—12 of Figure 11.

Figure 13 is an enlarged, developed view of a valve opening in the mechanism of Figure 11.

Figure 14 is a sectional, detail view of a valveless atomizer.

Figure 1 shows, more or less diagrammatically a conventional form of engine case 18, having, as it happens, six cylinders 20, arranged in groups of three, each group equipped with an intake manifold 22, with a common outlet 24, the passage from this manifold to each cylinder being controlled by a separate valve 26, actuated in conventional manner by the cam mechanism of the engine, not shown.

These manifold outlets 24 each enter opposite ends of an outside manifold or pipe 28, having conventionally near its center the ordinary air inlet passage 30 which in ordinary practice recesses the carbureter but which is in this invention left substantially open. One of the atomizing mechanisms of this invention is shown as a whole as 32 at opposite ends of this outer manifold pipe 28, being preferably in such a position that the atomizing means feeds directly into the openings 24.

The preferred, but by no means the only, atomizer device for use in this invention is shown in section in Figure 6 and includes an outer nozzle 34 having a contracted tip terminating in a discharge port 36. The body of this nozzle at about midway of its length is equipped with screw threads 38, or other suitable device, by which it may be attached in the position shown in Figure 1, to the manifold pipe 28 with the tip 36 pointed toward the adjacent opening 24. On the end of nozzle mechanism 34, opposite to tip 36, are screw threads 40, engaged by a nut 42, having a central perforation 44 through which passes and freely moves the main body portion 46 of an inner nozzle 48, having a tip port 50 in alignment with port 36, heretofore referred to. On this body member 46, inside the nut 42, is a flange 52, engaged by the nut and adapted to travel longitudinally of a recess 54, formed in the adjacent end of the body of nozzle mechanism 34. The external rear or right hand end of member 46 is provided with screw threads 56, engaged by a collar 58, adapted to form a bearing against the outer face of nut 42. The result of this construction is that when nut 42 is rotated on screw threads 40 in one direction, it engages flange 52 to move the entire inner nozzle mechanism to the left, as viewed in Figure 6, and that when the nut is rotated in the opposite direction, it engages collar 58 to move the same parts to the right. In other words, by rotating the nut 42, the nozzle port 50 can be made to approach or recede from the nozzle port 36, thereby controlling the operation of the device as hereafter described.

Inner nozzle member 46 is provided with a central perforation 60, terminating at its left-hand end in the port 50, heretofore described. This central perforation is occupied by a smaller reciprocable rod 62 forming at its left-hand end a valve 64 for the port 50. The right-hand end of rod 62 passes out of nozzle member 46 and is screw threaded at 66 into the core 68 of an electromagnet 70, energized by electric current delivered to it as hereafter described through the electric wires 72 of conventional form. This core 68 and consequently the rod 62 is normally urged to the left, as viewed in Figure 6, by a compression spring 74, abutting against a screw plug 76, fastened in the side of the magnet case 78 in conventional manner.

The operator can, by rotating rod 62 on its screw threads 66, position the effective length of the rod-core 68 so as to vary the amount of pressure exerted by spring 74 to force the valve end 64 of the rod 62 against its seat adjacent to the nozzle discharge port 50.

At the rear or right-hand end of the nozzle member 46 and entering internal perforation 60 is an air intake port 80, surrounded by a sleeve 82, having an annular groove 84 always in register with this port 80, said groove being itself entered by a passage 86 in a stem 88 extending from the sleeve, said stem being screw threaded at 90 for ready attachment to a source of compressed air, one particular form of which is more fully described hereafter. The sleeve 82 is held in the position shown in Figure 1 by virtue of the fact the screw threaded right-hand end of member 46 enters a base member 92 forming the support for electromagnet 70 heretofore referred to.

The left-hand or nozzle end 48 of the member 46 is, as shown, smaller than the internal diameter of nozzle member 34, with the result that an annular space 94 is formed between the two nozzles through which gasoline or other motive material delivered through an intake port 96 may travel to the discharge port 36, heretofore referred to.

In the operation of the mechanism shown in Figure 6, the parts are assembled as shown in the drawing with the fuel intake port 96 leading downward to a suitable source of fuel material always located below the level of the port 36. It is preferable to use as a source of such fuel material a conventional form of gasoline chamber—float controlled—which maintains a constant level. As such devices are well known in the art and form directly no part of the invention, this source of fuel material is not shown in the drawings.

Some sort of a gas, usually air under pressure, is supplied to passage 86 from which it flows through annular recess 84 through port 80 to internal recess 60, thence, if the valve is open, through port 50 and thence to and through port 36, in so doing creating in conventional manner a suction about the outside of nozzle member 48 to suck fuel up through port 96 through passage 94 and thence out of port 36.

Under normal conditions, the spring 74 holds the valve rod 62 in its extreme left-hand position so that its valve end 64 is seated or closed to prevent the passage of air through the device in the manner described. When electric current is allowed to flow through circuit 72 and magnet 70, said magnet is energized to move core 68 and consequently rod 62 to the right, thus opening the valve port 50 and allowing the air to pass and therefore deliver fuel through nozzle 36 in the manner described. Obviously, fuel is only delivered during the period of time that the magnet 70 is thus electrically energized. When the mechanism is applied to an engine, as shown in Figure 1, the wires 72 are connected, as shown diagrammatically in Figure 3, into an electric circuit, which includes an automatic magnet control device, one form of which is shown in Figures 7, 8 and 9, adapted to, as the engine operates, periodically complete the electric circuit through the mechanism 70 to cause the mechanism of Figure 6 to deliver proper amounts of fuel material to the adjacent port 24, heretofore described. The mechanism is preferably so applied to the engine mechanism that by the device of Figure 2, the compressed motive material delivered to air passage 86 and thence through the nozzle passage 60 is compressed gas taken out of the engine cylinder itself.

The electric distributor mechanism for controlling the flow of electric current to the magnet 70 for the purposes heretofore referred to, shown in Figures 7, 8 and 9, includes a suitably journaled shaft 100, attached at say 102, to any suitable rotating part of the conventional engine to which the device is applied—in the particular case here illustrated, the drive shaft 104 ordinarily used for driving the timer in connection with the electrical ignition.

These two shafts which are in alignment with each other are in conventional manner seated in a base member 106 equipped with a conventional timing arm 108, the same being carried by a portion 110 of the engine frame. The drawing shows this member 106 conventionally angularly adjustable in the frame 110 by means of set screw 112 entering a conventional groove 114.

Rigidly mounted on the base 106 by any suitable means, as, for instance one or more screws 116, and enclosing the shaft 100 is an insulating casing 118 enclosing and protecting a spool 120. This spool is connected to the shaft 100 by means, such for instance as a spline 122 which renders it reciprocatable lengthwise of the shaft but prevents its rotation with reference to the shaft, though, of course, the spool necessarily rotates with the shaft when it is in motion.

At the upper end of spool 120 are two parallel collars or flanges 124, entered by anti-fricton rollers 126 on opposite forked arms 128 of a bell crank arm 130 pivoted outside the case 118, say at 132. The opposite arm 134 of this bell crank is attached to a connecting rod 136 leading to the control lever on the starting wheel of the automobile, not shown, to which the device is applied.

On the lower end of the spool 120 is an insulating collar 138, rigidly secured in place by any suitable means, as for instance screws 140. At one point on the circumference of this collar 138 is a triangular metal plate 142, held in place by screws 144 which pass through the insulating material 138 into the spool 120. The result of this is that the plate 142 is in electrical connection, through the parts named, with the shaft 100. This shaft 100 is normally grounded anyway, but the grounding is made sure of by causing the shaft to rotate in the metallic bushing 146 to which is connected a metallic rod 148, terminating in a binding post 150, intentionally connected to ground.

The insulating case 118 is, as shown in Figure 9, cylindrical in cross-section and is entered at a point above the top of contact 142 when in the position shown in Figure 7 by six radially disposed, generally equally spaced, contact points 152. Each contact point is conventionally flexibly mounted on springs 154 and terminates in a suitable binding post 156, to which electric wire may be attached. This circle of contact points 152 is, as heretofore noted, located just above the upper point of contact 142 when the spool 120 is in lowest position, as shown in Figure 7; but they are in addition in such a position that when the operator in the automobile manipulates rod 136 to raise the spool, these contacts 152 will be in the path of travel of varying points along the vertical height of the contact 142, depending upon the height to which the spool and consequently the contact 142 is raised. For instance, when the spool is raised as far as it will go, the contacts 152 will engage a circumferential line 158 across the bottom of contact 142, viz: at the base of the triangular plate, with the result that in this position, the electric circuit through wires 72 will be in operation throughout the longest period of time which it is possible for the particular machine shown to produce. Obviously, when this spool 120 is held so that the contact 142 closes contacts 152 at a point half-way up the contact 142, the electric circuit will be maintained through the magnet 70 for one-half the time just described and when the spool 120 is in such a position that a point near the top of contact 142 travels over contacts 152, the period of energization of circuit 72 and consequently magnet coil 70 will be very short. The result of this construction is that by shifting contact plate 142 as may be desired vertically, the operator is able to produce a fuel charging time in the cylinder to which the device is applied, ranging from a very short time to the maximum period of time desired—this analogous to the manner in which in my said prior patent, by controlling the triangular valve opening, variation in fuel charging is taken care of.

As in said prior patent, the device 142 which controls the fuel supply is made with a line 160 parallel to the axis of the shaft 100, so positioned that no matter what length of fuel feeding takes place in the manner described, the fuel is cut off at the same point in the rotation of the engine's crank shaft. In practice, as in said prior patent, the parts are so arranged that this cut-off takes place when the crank is practically on its down stroke or end of the suction period.

By the construction which enables the contact block 142 to drop entirely below the contacts 152, the operator is able in going down hill to entirely stop the flow or charging of fuel material into the engine cylinder, while allowing the cylinder to pump free air to assist in braking action on the car in its down-hill travel. This is an entirely new and meritorious feature as all engines now in use, so far as I am aware, necessarily use some fuel, fired or un-fired, when running down hill.

Having provided the mechanisms of Figures 6–9, the atomizer mechanism is applied, as shown in Figure 1, and in section in Figure 2, air port 86 being attached to a pipe 162 leading to a compressed air storage chamber 164 as shown in the drawings, equipped with a conventional form of pressure gauge 166. This tank 164 is provided with two sources of compressed air (or gas): one a conventional hand pump 168 used only when the engine is not running and is to be started; the other being a pipe 170 leading through a conventional form of check valve 172 to a port 174 especially provided in or near the lower portion of cylinder 20, slightly above the extreme lower position of travel of the piston 176. The result of so locating this port 174 is that gases under pressure in the engine cylinder, when they are coolest and nearly completely expanded, are allowed to escape as the piston 176 uncovers the port 174 through the trap 172 and pipe 170 into the tank 164.

By suitably varying in either initial construction or otherwise the location of the port 174 in relation to the maximum down stroke of the piston 176, any desired pressure existing in the engine cylinder between the top and bottom stroke of the piston 176 can be taken off into the tank 164. By thus properly selecting such pressure in initial construction or otherwise, the tank 164 can be maintained at a proper pressure to operate the atomizer to deliver fuel to the engine cylinder.

Assuming that there is in the tank 164 a proper air or gas pressure produced initially by the pump 168, and afterwards by the continued operation of the engine through the presence of compressed gas delivered through trap valve 172, the operation of the mechanism is as follows:

The air or gas travels from tank 164 through pipe 162 to air passage 86 and thence, if valve 50—62 is open, through the ports 50—36 to draw fuel material from the source not shown, through pipe 96, passage 94 and port 36 into the engine cylinder 20. This mixture of air or gas from tank 164 and the atomized fuel carried with it is only delivered into the cylinder during the time that contact member 142 is traveling over the particular contact 152 which controls that particular cylinder; but port 30, being wide open as heretofore described, the engine piston 176 draws in, regardless of the fuel delivery, a full charge of atmospheric air at atmospheric pressure, thus getting a complete cylinder full of atmospheric air into which the atomizer delivers fuel material at the point in the operation of the piston when that charge is desired. In other words, the fact that the gas delivered from engine cylinder 20 to tank 164 is a product of a previous combustion and not pure air does not in any way affect the successful operation of the engine, because the engine receives plenty of fresh air through port 30. In actual practice, the amount of air or gas taken from tank 164 to operate the atomizer is a very small percentage of the complete cylinder volume.

In actual practical working of the device of this invention, it is found that when the engine is running practically idle, the engine obviously sucks a practically full cylinder full of atmospheric air before the fuel charge is delivered during a short period while the upper part of triangular contact 142 is in engagement with its adjacent contact 152, with the result that the engine operates under small charges of fuel material but at constant compression, with the result that the engine has, even when idling, as described, or running under light loads, exactly the same compression as though operating under a full load, and it therefore operates at the same efficiency as is well understood in the art.

Figure 10 shows a modification of the extreme left-hand end of Figure 6 in which valve rod 180, replacing rod 62, is provided with an extension member 182 which passes through port 50 and carries a valve plug 184 adapted to close port 36 to mechanically prevent any accidental escape of fuel material.

Figures 4 and 5 show an atomizer mechanism having many of the same parts, as shown in Figure 6, in which the central nozzle member 200 is made so that in the operation of feeding fuel it is rotatable or rockable instead of reciprocatable, as is the member 62 of the prior construction; although, as before, the device can be adjusted longitudinally by action of the nut 202 replacing nut 42 against the action of spring 204 as is quite obvious from viewing Figure 4.

In this modified construction, the travel of the air from port 80 is through a central passageway 206, a radial port 208, a longitudinal passage 210, a radial port 212 and a central port 214 leading to discharge port 216, corresponding to discharge port 36. These ports and passageways 208, 210 and 212 are so located with reference to each other that, as shown in cross section in Figure 5, in one angular position of member 200, there is a clear passage through these openings, and in another angular position, a solid part of outer nozzle 220 obstructs access between ports 208 and 212.

In a similar manner, the gas intake passage 222, when in fuel delivery position, is so shaped that the gasoline has to travel through passageways 224—226 and 228 which, as before, are so arranged that when member 200 is rocked between the positions shown in Figure 5, the flow of gasoline is obstructed in one of these positions.

The two valved devices, just described, are so located with reference to each other that when member 200 is rocked to the position which opens one valve, the other valve is open and that both valves are simultaneously closed.

Member 200 is electrically rockable by connecting it to an armature 230 located between suitable pole pieces 232 which are electrically energizable through the same distributing mechanism of Figures 7–9 to, as contact plate 142 rotates, properly energize these pole pieces to properly rock the valve mechanism to admit and close off air and gas material as the engine requires, as set forth in the previous description of the operation of the engine.

Figures 11 to 13 show a mechanical valve mechanism which is capable of substitution for the electric mechanism of Figures 7–9. Case 234 is provided, taking the place of case 118 of Figure 7, admitting through an opening in that part of the case which is not shown in Figure 11 the forked arms 128 of lever 130. As before, these arms 128 carry rollers 126 which enter an annular recess formed in a collar 236 attached by any suitable means, such as screw threads 238, to a hollow shaft 240 which is rotatable with shaft 242 journalled in case member 234 and driven by engine shaft 104, heretofore referred to. Shaft 240 is, while rotatable with shaft 242 rendered reciprocable with reference to it by means of keys 244 rigid on shaft 242, traveling in oppositely disposed slots 246 of conventional form, extending along shaft 240. From the foregoing, it will be seen that when the operator manipulates rod 136, to rock bellcrank 134—130, he raises or lowers, as the case may be, hollow shaft 240, regardless of its angular rotative position in the case as driven by engine shaft 104 and, consequently, shaft 242.

Rigidly attached to the upper end of shaft 240 by any suitable means, as, for instance, a block 248, and pin 250, is a hollow shell piston valve 252, having its piston wall proper provided with one or more perforations 254, through which incoming air delivered from pipe 256 to air chamber 258 may pass into the hollow open bottom space 260 in the piston 252. The air space 258, just referred to, is formed in a cylinder or casing 264 which is secured in the upper end of case 234 by any suitable means, as, for instance, the screws 266. In the lower end of this case 264, below the extreme limit of travel of piston 252, is a closure guide block 268, detachably held in place by any suitable means, as, for instance, screws 270. A suitable stuffing box device 272 is provided at the bottom of guide block 268, through which piston 240 moves in obvious manner.

Arranged radially of cylinder 264 and at approximately the position shown with reference to the piston 252, when in its lowest position, are a plurality—in the particular case here illustrated six—of air discharge ports 274, each connected by pipes 276 to one or the other of the atomizers 32 adjacent to the engine as shown in Figure 1. When piston 252 is in the position of Figure 11, it closes all of these ports 274, preventing any air passing from pipe 256 to any atomizer, thus preventing the delivery of any fuel to the engine. At one point in the circumference of piston valve 252 below ports 254 is a triangular port 278 arranged, as is contact plate 242, with one straight edge 280 parallel to the axis of shafts 240—242.

As before, the device is operated by the continuous rotation of engine shaft 104 and consequently of shaft 240 and valve member 252. When the operator by manipulating rod 136 in the manner heretofore indicated elevates shaft 240 past lugs 244, he, after a time, brings the upper point of port 278 high enough so that in the rotation of valve 252 a predetermined, desired portion of angular port 278 passes over and registers with a port 274, with the result that during the period port 278 is passing over such port 274, air flows from pipe 256 through port 254 and thence to and through port 278 to the adjacent port 274. When the operator moves piston 252 up as far as it will go and brings the widest or bottom portion 282 of port 278 across a given port 274, air is thus admitted to that particular port for a maximum amount of time.

From the foregoing, it will be seen that the operator by varying the height of piston 252, and consequently valve port 278, secures exactly the same variation as was produced in the electrical structure by varying the height of triangular contact plate 142.

In order to adjust or compensate this mechanical mechanism to the crank rotation of the engine, viz: the same conditions for which the spark of the engine is advanced or retarded, the case 234 is provided with a hand lever 284 by which the operator may easily rotate it and with set screw device 286 by which it may be selectively locked in any desired angular position with reference to the drive-shaft 104.

As in the prior construction, pipe 256 is preferably identical with pipe 162, securing its compressed air from the air chamber 164 heretofore fully described.

Figure 14 shows a modified atomizer having particular advantages. It includes an exterior nozzle 290, corresponding in all essential particulars to nozzle 34, having at its tapered end the discharge port 292. As before, the rear of the nozzle is provided with screw threads 294, cooperating with which is a hand manipulatable nut 296, having rotatably connected to it by any suitable means, as for instance, the flange 298 and the nut 300, an inner nozzle 302, having a discharge port 304 registering with port 292.

In this device, gasoline, or other liquids to be sprayed, is delivered through pipe 306 to the passage 308 between the two nozzles and thence to a port 292. Air or other motive gas is admitted at port 310 from which it passes through central passage 312 of nozzle 302 to port 304, through which it passes to port 292 in obvious manner. The operator can, by taking hold of nut 296, rotate it to reciprocate without rotating nozzle 304 toward or from port 292 to vary the proximity of port 304 to said port 292 and consequently control the delivery of material by the atomizer.

In the electrical device of Figures 7–9, three of the contacts 152 lead to the coil controlling the left-hand atomizer 32, Figure 1; and the remaining contacts correspondingly lead to the right-hand atomizer 32. In a similar manner, three of the pipes 276 lead to left-hand atomizer 32 and the remaining pipes lead to the right-hand atomizer—this so that the firing sequence of the cylinders may be maintained as the engine manipulates in succession valve 26 in conventional manner.

From the last paragraph, it is seen that two different atomizers are controlled in succession by the operation of electric switch contact 142 or valve port 278 as shaft 104 rotates. While ordinarily the operator will hold the control member 142 or 278 in stationary position so that each atomizer will successively receive the same amount of material to be delivered to the engine, there is nothing in principle to prevent the operator's so manipulating rod 136 that a maximum charge is delivered to one atomizer and a minimum to the next atomizer.

The claims involving the "combustion space of an internal combustion engine provided with an air intake passage, a fuel nozzle adapted to deliver oil, an independent motive fluid, such as air, nozzle adapted to take oil from the fuel nozzle to the combustion space, a compressed motive fluid tank, delivering motive fluid to said second nozzle, and means whereby the proper pressure is maintained in said tank by motive fluid delivered to it from said combustion space of the engine"—are reserved for and included in a divisional application entitled: Constant compression internal combustion engine, filed June 15th, 1925, Serial Number 37,087.

Having thus described my invention, what I claim as new and desire to secure by Letters Patent is:

1. In mechanism of the class described, an outer nozzle having an end discharge port, an inner hollow nozzle, having a port delivering to the first port, means supplying materials to the space between the nozzles and to the hollow in the inner nozzle, means rotating one nozzle with reference to the other, and valve mechanisms formed between the nozzles operated by the movement of said rotatable nozzle, simultaneously controlling the passage of materials through the nozzle device.

2. In mechanism of the class described, an outer nozzle having an end discharge port, an inner hollow nozzle having a port delivering to the first port, means supplying materials to the space between the nozzles and to the hollow in the inner nozzle, means rotating the inner nozzle with reference to the outer, and valve mechanisms formed between the nozzles operated by the movement of said rotatable nozzle simultaneously controlling the passage of materials through the nozzle device.

3. In mechanism of the class described, an outer nozzle having an end discharge port, an inner hollow nozzle, having a port delivering to the first port, means supplying materials to the space between the nozzles and to the hollow in the inner nozzle, means rotating one nozzle with reference to the other, valve mechanisms formed between the nozzles operated by the movement of said rotatable nozzle, simultaneously controlling the passage of materials through the nozzle device, and electric motor means for selectively rocking the rotatable nozzle.

4. In mechanism of the class described, an outer nozzle having an end discharge port, an inner hollow nozzle having a port delivering to the first port, means supplying materials to the space between the nozzles and to the hollow in the inner nozzle, means rotating the inner nozzle with reference to the outer, valve mechanisms formed between the nozzles operated by the movement of said rotatable nozzle, simultaneously controlling the passage of materials through the nozzle device, and electric motor means for selectively rocking the rotatable nozzle.

In witness whereof, I have hereunto subscribed my name.

JAMES A. CHARTER.